Patented May 25, 1943

2,320,165

UNITED STATES PATENT OFFICE 2,320,165

METHOD OF MANUFACTURING PROTEIN PRODUCTS

Francis C. Atwood, Newtonville, and William Paterek, Brighton, Mass., assignors to Atlantic Research Associates, Inc., Newtonville, Mass., a corporation of Delaware No Drawing. Application March 7, 1939, Serial No. 260,334

7 Claims. (Cl. 260—120)

This invention relates to protein products and methods of making the same, and more particularly to an improved low ash rennet-precipitated casein and the methods by which it may be produced.

Casein is used extensively in widely diversified industries, particularly in the manufacture of synthetic fibres, films and casings; plastics; paints; sizes and adhesives. In order to meet the requirements of commercial standards, a casein should have many desirable characteristics, primarily that of uniformity, ready solubility, and low ash or impurity content. Its desirable properties should also include the ability to be dispersed in a solution without foaming, and to form a clear solution or dispersion that will yield products that excel in clearness, toughness, plasticity and stability.

Casein in quantities sufficient for commercial purposes is generally precipitated from skimmed milk by the addition of mineral acids to the milk, or by natural acid fermentation. In the acid precipitation, however, agglomerated curds are usually formed, which tend to occlude impurities comprising primarily mineral salts naturally occurring in the milk. Once the curds are formed it is very difficult, if not impossible, to wash the salts from the hard curds. This results in a casein having a high ash content, and renders it unsuitable for the many purposes for which a low-ash casein can be used advantageously. Attempts have been made to avoid this difficulty by the instantaneous mixing of acid and milk in dilute solution, but such careful control is required that the desired result cannot be achieved under commercial conditions, and under the best conditions, some salts are retained in the curd. On the other hand, the reduction of the acid precipitated curd to finely divided particles by agitation of the milk during coagulation, in order to make the subsequent washing more effective as a means of removing salts, has proven inefficient because portions of the curd are lost with the whey and the total casein yield is reduced from 10 to 20%. The character of the casein curd, its solubility, ash content, and other properties are so dependent upon such slight variations in the process of making the casein as to render it commercially impossible to produce a standard casein. In fact, commercial caseins on the market today vary so much that when large quantities of a uniform product are desired for a particular purpose, it has been the practice to blend many types of casein to attain a uniform product, sacrificing quality for uniformity.

The production of casein from milk by the addition of an enzyme, such as rennet, has heretofore been unsatisfactory because of the characteristic very high ash content of the ordinary rennet-precipitated casein. This very high ash content has made the rennet-precipitated casein useful for only certain limited purposes.

The manufacture of many products requires a casein of extremely low ash content. In particular, the products of synthetic protein fibers, that are similar to natural sheep's wool, and the production of transparent films of great flexibility, require a casein that is very low in ash. The exact process employed in manufacturing these products depends somewhat on the properties of the casein used as the raw material and therefore a standardized process requires a casein that is uniform. Due to lack of uniformity in the casein, as well as high ash content, present methods of obtaining casein do not produce a product that is satisfactory for manufacturing many products, particularly synthetic fibers and films.

It is an object of our invention to produce a new casein product of low ash content, in fact so low as to be comparable to the ash content of the so-called "chemically pure" caseins available for scientific research purposes.

It is also an object of our invention to provide a casein that is particularly suitable for use in producing synthetic fibers similar to natural sheep's wool and for use in making flexible transparent films.

It is, in addition, an object of our invention to provide a simplified process for the manufacture of a uniform casein on a commercial scale, thereby permitting manufacture of a casein of uniform high quality with a minimum of skilled and technical supervision, and permitting the manufacture of products whose development has been made heretofore impractical by lack of a high grade uniform inexpensively produced casein.

It is a further object of our invention to provide a process that can be readily employed by small producers of casein with a minimum of apparatus and skilled training, but to yield a casein that can be produced batch after batch, even by different producers, with uniform properties.

The casein made in accordance with our invention has also been found to be more desirable than casein made by present processes for use in the preparation of plastics, and as a binder in paints, paper coatings and in food products, and it is an additional object of our invention to produce a casein for these purposes.

Casein produced by precipitation with rennet differs from casein precipitated by acid. In accordance with theory, but to which we do not regard ourselves as bound in any way, the rennet is believed to divide the casein molecule. Whatever may be the chemical explanation, the casein obtained with rennet has certain properties which differentiate it from acid precipitated casein. Rennet-precipitated casein is generally known as paracasein. We regard the latter expression as an equivalent of the heretofore known rennet-precipitated casein and generally to define such a casein and distinguish it from acid precipitated casein. Paracasein has many desirable properties, even when produced by ordinary processes, but these are generally outweighed by its ordinary high ash content which renders it undesirable.

It is an object of our invention, therefore, to provide a rennet-precipitated casein which also has a low ash content.

A further object of our invention is to provide a high grade casein excelling in plastic properties, purity, toughness, lack of clouding or foaming when placed in solution, ease of solubility, and which has a marked freedom from tendency to develop odors when in a finished product.

It is an additional object of our invention to provide a casein having all of the properties above described, and having a pH value higher than the isoelectric point of the casein, and to provide a process of producing the same.

A further object of our invention is the production of casein that has a soft, granular curd of open cake structure, which may be readily washed, and which curd does not have the adhesive characteristic of acid precipitated casein.

An additional object of our invention is the provision of a casein that is soluble in small amounts of an edible acid and which is available as an ingredient for food products.

Still a further object of our invention is the production of a casein that can be formed into a dispersion of much lower viscosity than that obtainable with caseins available heretofore.

Further objects will appear in the following description in which the preferred embodiments of our invention are set forth in detail.

Inasmuch as the ash content is an important aspect of our invention, it is believed well to discuss this before proceeding further with a description of our invention.

Quantitative analysis of the so-called "chemically pure" caseins (by the method of Hammarsten), which are used in biological research work, shows that they have an ash value of 1.8%. Experiment has shown that any attempt at further reduction of the ash value seriously deteriorates and alters the quality and nature of the casein product itself, and that for all practical purposes, 1.8% represents the irreducible minimum ash content of casein, the residue ash consisting primarily of calcium monophosphate. Apparently the phosphorous content of casein cannot be lowered below this point without destroying the stability of the casein molecule and the calcium in such a casein is apparently the smallest amount that is necessary for chemical combination with the essential phosphorous content.

It should be observed, also, that in determining the ash content of a casein, the method of analysis assumes great importance when the ash value runs below 2½%. For accurate results, it is necessary to use the so-called calcium acetate method of casein analysis, which method prevents the loss, during the ignition and ashing, of the small phosphate constituent necessary to the stability of the product. In other processes of determining ash, the phosphorous component is at least partially destroyed. This accounts in part for the inaccurate low ash values heretofore reported as attainable in commercial brands of casein. Such brands of casein when analysed by the above mentioned method show a much higher ash value. Prior disclosures of casein having an ash value under 2½%, unless accompanied by a statement that an acceptable method was used in making the ash determination are apt to be erroneous.

We have discovered that an enzyme-precipitated protein can be produced having an ash content of not over 4% and if desired an ash content consistently within 2% as determined by the aforementioned method. Our process consists preferably in completely coagulating protein by an enzyme, such as rennet, adjusting the acidity of the protein and whey mixture to a point near the iso-electric point of the protein (a pH of about 4.6 to 4.7), separating the protein from the whey, and preferably washing the protein to retain it at its iso-electric point or to adjust the pH value of the protein to any desired value.

Our process is applicable primarily to skimmed milk, but also may be used in separating the casein content of soya bean meal and other acid coagulable alkali soluble proteins. When treating soya bean casein it is desirable to add a small amount of calcium chloride and to adjust the pH of the mixture to 5.5 to 6 in order to facilitate the action of the enzyme.

Any suitable enzyme, other than rennet, that is capable of coagulating the protein may be used. Examples are pepsin and peptic proteoses. The enzyme should not produce any proteolytic action beyond the formation of paracasein unless desired and controlled.

In accordance with our process, rennet-precipitated casein curd is reduced to and maintained at its iso-electric point, at which point it has maximum insolubility, while at the same time the acidic whey is enabled to penetrate the curd to dissolve all but the chemically combined salt content in the casein. Our process also enables the production of a low ash casein without having brought the pH value of the curd or whey materially below 4.65. While a lower acidity can be used, with its corresponding disadvantage, we have found it to be particularly advantageous to adjust to a pH of about 4.6 to 4.65 in view of the fact that casein appears to undergo some type of irreversible degradation action or denaturing if the casein is subjected to acidity below a pH of 4.6 at the time of its precipitation or during the removal of the salts therefrom. This action appears to be proportional to the degree of acidity to which the casein is subjected below its iso-electric point.

Our process also does not use any excess of acid and effects a substantial economy through the minimum acid requirements.

The adjustment of the pH value of the curd and whey mixture near the iso-electric point of casein is very simple and can be done with a suitable indicator or electric pH meter. Upon such adjustment the resultant product is uniform. The control of the type of curd obtainable, by means of controlling the pH of the curd and whey mixture at the time the curd is separated from the whey, is a tremendous advantage in stabilizing large scale production of casein.

The washing of the casein after it is separated from the whey, to adjust the pH value of the casein to any value desired, may be accomplished without the addition of alkali. While small amounts of alkali or acid can be used in the wash water, ordinarily this is not necessary. We have discovered that the higher the pH value of washed casein, the more desirable it is for certain uses, particularly in the manufacture of synthetic wool fibers and the production of transparent flexible paper.

Our process can be practiced either in batch operations or as a continuous operation or a combination of both. When practiced as a batch operation it gives a product that is uniform with each batch, a result not obtainable by the batch production of acid precipitated casein. In the batch operation of our process, a quantity of skimmed milk has the casein thereof precipitated; this batch is then acidified, the casein separated therefrom, and washed, the same batch being treated at each operation. On the other hand, in a continuous process, the acidification, separation, and washing of the casein can be carried out continuously. Combinations may be made, for example, the casein may be precipitated in batch operation, following which the acidification may be continuous. The separation and washing may be continuous or batch.

The following process is a more detailed description of our invention but is not intended to limit the invention described above. One thousand pounds of skimmed milk is placed in a suitable tank and heated to a temperature of 75 to 85° F. One hundred cc. of a commercial grade of rennet is diluted with three liters of water and stirred into the milk for approximately ½ min. The coagulation of the casein is then allowed to proceed, without stirring the mixture, for an interval preferably from 30 to 45 min.

The amount of rennet employed is not critical and merely affects the rate of coagulation of the casein. As commercial rennet is inexpensive, it has been found convenient to use larger amounts in order to separate the casein more quickly. The amount of rennet used, the temperature of the milk, and the time required for coagulation of the casein are more or less inter-related, but are not critical, and any of these factors may be varied so long as precipitation of the casein is accomplished.

The coagulation by means of rennet produces a clabber-like, gelatinous, uniform mass; the end point in the coagulation is that at which a portion of this mass, when broken up, will express a clear whey. When this point is reached, the entire mass is agitated with a stirring or agitating device to quickly break the mass down to a particle size of about 10 mesh. For practical purposes, the agitation should not be so great as to produce particles much finer than 10 mesh, due to the fact that the separation of the curd from the whey is rendered more difficult, and the danger of loss of curd through colloidal suspension thereof in the whey is enhanced.

Immediately upon reduction of the curd to the desired fineness, acid is added to the agitated mixture for the purpose of adjusting the pH of the curd to a point near the isoelectric point of the casein. To this end, two quarts of 35% hydrochloric acid is diluted with water to give five gallons of the dilute acid, and this is added to the mixture. Sulfuric, lactic, or any other acid which will produce soluble salts of the mineral and other impurities occluded in the curd, may be used in the place of hydrochloric acid. Under normal conditions and with a sweet skimmed milk, this amount of acid or its equivalent will acidify the whey to a pH value of approximately 4.6.

It is preferable to add enough acid to lower the pH value of the mixture to at least 4.65. Otherwise the maximum insolubility of the casein will not be obtained, and the ash content will not be lowered to the desired minimum. If more acid is added, so that the pH value is reduced below 4.6, and to some point preferably not below 4.0, a low ash casein will result, but the final adjustment of the pH in the washing operation will be more difficult. Also there may be an undesirable degradation of the protein.

In the production of casein for use in making synthetic fibers, it is preferred to adjust the pH value as close to 4.6, at this stage of the process, as is practically possible.

If an unusually high ash content in the casein is indicated, the pH value of the curd and whey mixture may be lowered to a point preferably not below 4.0. A low ash casein will be formed within a limited time, but this modification of the process necessitates adjustment of pH during further treatment of the casein, as will be discussed hereinafter.

The curd is kept suspended in the whey by gentle agitation after the agitation is started and during the addition of the acid. Once the gelatinous formation of the curd mass is broken, the curd must not be allowed to settle in the whey until the iso-electric point of casein is reached. Otherwise the curd particles, upon settling, would pack and form a hard mass through which the acid solution penetrates only with difficulty. Under such conditions the curd begins to shrink and a film or membrane is formed over the surface of each particle. If this action takes place, it is difficult to reduce the ash to the desired value.

Once the curd is broken up after precipitation, the immediate addition of the acid is highly desirable. If the acid is added immediately, little difficulty is experienced in reducing the ash content of the casein to a point of 1.8% or 1.9%.

The difficulties of demineralizing the rennet-precipitated casein increase in proportion to the time elapsing between the breaking up of the curd and the completion of the acid treating process. For example, if the rennet-precipitated casein is dried, the product contains over 9% ash. If this is soaked for thirty hours in an acid solution having a pH of 4.42, the casein has an ash of 2.46%. If the same procedure is employed, but the strength of the acid is increased to a pH value of 2.10, the ash content is reduced to 2.05%, but the excess of acid used in either case undesirably increases the cost of production and requires a long time. The casin produced also is of inferior quality and the yield is lower due probably to a loss by hydrolysis.

Because of the desirability of adding the acid as soon as possible after the curd is broken, the addition of the acid as a continuous step in the process may be preferable, although the addition as a step in the batch operation produces a casein having the desirable properties described.

Following the addition of the acid, the curd is allowed to settle. This occurs rapidly because of the uniform granular size of the curd particles and freedom from colloidal or slimy adhesive qualities characteristic of acid precipitated curds after agitation. After the settling, the major portion of the whey may be decanted off. There is no objection to the settling once the isoelectric point of casein has been reached.

The remaining curd is then treated to reduce the whey content of the wet casein, preferably to not more than 60%. In effecting separation of the whey from the granular curd, the conventional presses may be used, but a perforated basket type centrifugal separator has been found to possess advantages over other types of dewatering mechanisms. For instance, when the casein is centrifuged within speed limits producing a proper centrifugal force component, the casein is satisfactorily dewatered.

We have discovered that speeds producing a centrifugal force of 20 g. to 40 g. are preferable. A force of 50 g. does not remove much more water than 20 g. and forces above 50 g. cause the casein to pack together in an undesirable manner.

Within the preferred range of 20 g. to 40 g. the casein is dewatered satisfactorily, but is left in a granular open cake form thus allowing spray washing of the casein during and without stopping the centrifuging.

Centrifuging at this force is also desirable in view of the fact that an ordinary centrifugal basket having a diameter of 48 inches, and running at 150 to 200 R. P. M., will develop the desired force. At this speed it is possible to load and unload the centrifuge while it is running, thereby rendering it unnecessary to start and stop the centrifuge.

If an imperforate centrifuge is employed, forces above 50 g. may be used, but the liquid must be taken off from the interior of the bowl and it is not as easy to wash the curd in an imperforate bowl. If desired, the washing may be accomplished by removing the casein from the centrifuge and agitating it in wash water after which it may be returned to the centrifuge to reduce the moisture content.

In a continuous process for separating the casein curd from the whey and washing the curd, it has been found desirable to place the casein particles in suspension in the whey on a continuously moving filter belt. The casein and whey mixture to be so treated may contain all of the whey, or a portion of it may be removed first by decantation.

The filter belt, with the casein and whey mixture thereon, is then moved over a suction box which removes the whey from the curd. The filter belt with the casein thereon is then moved under a spray of wash water. After the casein is permitted to remain on contact with the wash water for any desired period of time, the water is removed by the passage of the filter belt over a suction box. The whey and wash water may be collected separately. As many washing operations as desired may be employed depending upon the speed at which the filter belt travels and the pH value to be imparted to the casein.

The casein curd produced in accordance with our invention may be readily washed and freed from adherent whey because of the uniformity of the particle size of the curd, and the fact that the curd is soft and easily penetrated or washed. The individual particles of the casein curd do not have a tendency to adhere or stick together, as is the case in acid precipitated curd; as a result, the curd may be easily broken into its individual particles even after pressing or centrifuging operations to remove moisture. Because of this quality possessed by the curd, it is possible to lower the moisture content to 60% or lower in the wet curd stage. The granular form of the curd eliminates the necessity of breaking up a pressed cake or curd in a shredding mill as is the common practice with acid precipitated casein.

If the pH of the casein has been reduced to 4.0 in the acid treatment because of high ash content, or irrespective of its pH value if the casein is to be used for certain purposes in which it is to be dispersed with a minimum amount of alkali, it has been found desirable to raise the pH value of the casein to as high a point as possible by further washing with water. Consideration should be given to the water used for this purpose, particularly to the pH value of the wash water and its salt content. With reasonably soft water the pH of the casein may be raised to a point between 4.6 and 5.5 without undue loss of casein from redissolution in water. This modification of our process has been found particularly effective in the manufacture of caseins for the production of synthetic fibers.

Utilizing our process as above described, a high percentage of the coagulable protein is recovered from the skimmed milk. Following the procedure outlined herein, yields of from 2.90% to 2.95% of the low ash casein have been obtained.

The drying of the moist casein granules must be controlled carefully because casein of a lower ash content is more sensitive to heat. While the mechanical details of drying are the same as in drying any other casein, it is preferred to use a blast of warm drying air on the casein, maintaining a low temperature at the beginning of the treatment. The maximum starting temperature should be such as not to heat the casein above a temperature of 125° F. Overheating the casein at this point may undesirably glaze the casein particles, forming hard, brittle granules that have a relatively low solubility, or it may burn the casein to produce a dark colored product containing excessive moisture.

After the casein has been partially dried, the temperature of the casein may be raised somewhat, but about 175° F. is the maximum and this should be reached only at the end of the drying operation. If the drying air is heated to a temperature higher than the temperature to which the casein can be heated, it is essential that water should evaporate from the casein fast enough to prevent it from reaching the maximum temperatures mentioned above. Careful control of the heat is necessary because water can evaporate from the particles only at a definite rate, which rate limits the temperature of the drying air that can be used safely.

Our product when dried as above described retains the granular formation of the particles, so that the final operation involves only a slight crushing operation, as distinguished from the grinding operation now commonly necessary.

If desired, protein may be used in the moist condition and may also be stabilized without drying as described in application Ser. No.

169,469, filed October 16, 1937. In either of these forms, or after drying, the protein may be used as a base or raw material in the manufacture of many proteinaceous products, including plastics, fibers, films, paints, sizes, glues, and food products.

An advantage of the casein is that it can be formed into a solution having a much lower viscosity than that obtainable with ordinary casein. For example, a solution containing 3½ to 4 parts of water to 1 part of our casein has about the same viscosity as a solution otherwise identical but containing 5 parts of water to 1 part of ordinary casein.

Our casein product is particularly desirable as a raw material for the manufacture of casein fibers simulating natural wool. When using our casein for this purpose, it is preferable that it be washed to impart a final pH value of over 5. This makes it possible to use a smaller amount of alkali or dispersing agent in placing the casein in solution to be later spun into fibers. While the ash in a casein having an ash content above 2.25% tends to act as a solvent for the casein when it is being dispersed, the high ash content has an embrittling effect and does not produce fibers which are as flexible or as strong as those obtained with our casein which has an ash content of preferably 2% or below.

The casein to be used in manufacturing fibers and films may be dispersed advantageously in two steps. In making the solution from which the fiber or film is to be formed, enough solvent is added at the beginning of the operation to completely disperse the casein. The mixture is heated for several hours at approximately 170° F. and the amount of solvent is such as to obtain a pH value of about 6. After this solution is produced, and the casein completely dispersed, an additional amount of solvent, such as alkali, triethanolamine, or soaps, is added. This has an unusual clarifying action as well as increasing the viscosity and destroying a gel condition. The solution is unusually clear and transparent. The final addition of dispersing agent should bring the pH value to about 6.6 to 7. Although solutions made with our casein will have higher proportions of solids to achieve a given viscosity, than with ordinary casein, this does not increase the amount of casein used, because the weight of the fibers produced is directly proportional to the weight of the casein used in making the solution.

The casein to be used in fibers and films preferably should have an ash content of less than 2¼%, but in uses in which the ash content is not particularly critical, such as in paints, the ash content may be as high as 4%.

Casein made in accordance with our process also may be used advantageously in food products. When our casein is treated with an edible acid, such as acetic acid or citric acid, it goes into a clear solution with heat. Upon cooling, the product sets to a clear and relatively transparent gel even when used in proportions of 10 parts of water to 1 part of casein. This material can be beaten into a stiff, snow-white meringue-like foam. If during the whipping a small amount of an edible alkali, such as baking soda, is added, the casein coagulates and the foam is stabilized. The final pH value to which the mixture is to be adjusted will depend upon the materials employed and the properties desired, but it is suggested that a pH value of from 3 to 4.2 will be suitable.

The casein in a powdered form with citric acid could be marketed for use in preparing various gelatinous types of edible products. The amount of the acid may vary, but equal parts of acid and casein are suitable.

The casein made in accordance with our process can also be dispersed with an edible alkali such as ordinary baking soda. When this is used carbon dioxide is liberated to form a stiff snow-white, foamy mixture. Foams and meringues can be obtained with 1 part of casein to 10 parts of water, and a stiff marshmallow-like mixture can be made with 1 part of casein and 2 parts of water. When it is not desired to obtain a foaming action, the baking soda can be replaced by any edible alkaline salt such as sodium citrate or sodium acetate.

If this mixture is to be stabilized, a small amount of acid can be added so as to precipitate the casein while it is dispersed in the foam form. In stabilizing the product, the pH value to which it should be adjusted will vary somewhat but should preferably be within the range of 5 to 6 and not above 7.

The ability to disperse the casein so readily with both edible acids and alkalis suggests its use for preparing many edible products.

Many variations in the method of preparing our casein will be apparent, as will many uses for it. All such variations are intended to be included within the scope of our invention.

We claim:

1. A process of manufacturing a protein product which comprises adding a protein precipitating enzyme to an aqueous dispersion of an acid and enzyme precipitable protein, permitting the mixture to stand in a quiescent state to precipitate the protein in the form of a clot, breaking up the clot to form a curd, acidulating the mixture immediately after precipitation and prior to separating the curd from the liquid in which it is precipitated, and separating the protein from the liquid.

2. A process of manufacturing a casein product, which comprises adding a casein precipitating enzyme to an aqueous dispersion from which casein may be precipitated, permitting the mixture to stand in a quiescent state to precipitate casein in the form of a clot, breaking up the clot to form a casein curd, acidulating the mixture with a strong mineral acid to at least the iso-electric point of the casein immediately after precipitation and prior to separating the casein from the liquid in which it is precipitated, separating the acidulated aqueous portion from the casein, washing the remaining casein, and drying the same.

3. A process for manufacturing casein comprising precipitating the casein from a milk by means of rennet in a quiescent state to form a clot, breaking the clot and acidulating the casein mixture immediately after precipitation and prior to separating the casein from the whey in which it is precipitated, and separating the casein therefrom.

4. A process for manufacturing a low ash casein comprising precipitating casein from milk with rennet in a quiescent state to form a clot, acidifying the casein and whey mixture to a pH value of at least 4.65 after precipitation of the casein by the rennet and before the casein has settled out as curd from the whey in which it was precipitated, separating the casein from the whey, and washing the same.

5. A process for manufacturing a low ash casein comprising precipitating casein from skimmed milk with rennet in a quiescent state to form a clot, breaking up the clot to form a curd, acidifying the casein and whey mixture to a pH value of approximately 4.6 to 4.65 immediately after precipitation and prior to separating the casein from the whey in which it is precipitated, separating the casein from the whey, washing the casein and drying the same.

6. In the manufacture of a casein product having a low ash content, the steps comprising adding a casein precipitating enzyme to skimmed milk, permitting enzyme to act upon the milk in a quiescent state to precipitate the casein and form a clabber-like mass, agitating the mass upon precipitation of the casein to reduce the curds to a small particle size, adding to the mixture of curds and whey before the curds have settled out and while in a state of agitation an acid in an amount to impart to said mixture an acidity such that the pH value thereof is not substantially below 4.0 and not substantially above the iso-electric point of casein, removing the excess whey to form a substantially open cake of non-adhering granular casein curds, washing the open cake by spraying water thereon to remove any remaining whey, removing the excess water to reduce the moisture content of the cake, and heat drying the casein.

7. In the manufacture of casein having an ash content below 2¼%, the steps comprising adding rennet to skimmed milk, permitting the rennet to act upon the milk in a quiescent state to precipitate casein and form a clabber-like mass, agitating the mass upon precipitation of the casein to reduce the curds to a particle size of approximately 10 mesh, adding to the mixture of curds and whey before the curds have settled out and while in a state of agitation an acid in an amount to impart to said mixture an acidity such that the pH value thereof is about that of the iso-electric point of casein, decanting at least a part of the acidified whey, removing the remaining excess whey to form a substantially open cake of nonadhering granular casein curds, washing the open cake by spraying water thereon to remove any remaining whey and to raise the pH value of the curds to not less than 5, removing the excess water to reduce the moisture content to not more than 60%, and heat drying the casein at a starting temperature of not over 125° F. and raising the temperature as drying proceeds to not over 175° F.

FRANCIS C. ATWOOD.
WILLIAM PATEREK.